Oct. 2, 1962   S. F. JAROS   3,056,616
REDUCER PIPE JOINT
Filed April 6, 1959

INVENTOR.
STANLEY F. JAROS
BY
Ely, Pearne & Gordon
ATTORNEYS

United States Patent Office 3,056,616
Patented Oct. 2, 1962

3,056,616
REDUCER PIPE JOINT
Stanley F. Jaros, 18850 S. Woodland, Cleveland 22, Ohio
Filed Apr. 6, 1959, Ser. No. 804,503
4 Claims. (Cl. 285—332.1)

This invention relates to a pipe union for joining two pipes forming part of a fluid conducting line in which a change of pipe size is desirable or permissible.

In fluid conducting lines in which a change of pipe size is necessary or desirable, such change is usually accomplished either by appropriate reducing fittings or by including a section of pipe which is tapered at one end to provide a different pipe diameter at each end of such section. The various sections in the fluid conducting line in which the change of pipe diameter occurs are joined by unions which include a male element threaded to one pipe section, a female element threaded to the other pipe section, and a coupling collar clampingly engaging one of the mating sections and drawn up in threaded engagement on the other of the mating sections.

The object of the present invention is to provide a pipe union which takes advantage of the desirability or permissibility of changing the pipe diameter in a fluid conducting line in such a way as to accomplish the change in diameter at the union to reduce manufacturing costs. As compared to conventional couplings in a changing-diameter fluid conducting line, the pipe union contemplated by the present invention is relatively compact and comprises less parts and in other respects lowers manufacturing costs.

The present invention accomplishes a change in pipe diameter from a relatively large pipe section to a relatively small pipe section through the use of only one separate part, namely an internally threaded coupling collar, clampingly engaged with one of the pipe sections and drawn up in threaded engagement with the other of the pipe sections. A difficulty in obtaining a change of pipe diameter directly from a relatively large to a relatively small pipe with only a single coupling collar therebetween is the necessity of providing adequate strength at the union. Such direct coupling has heretofore either necessitated the use of extra thick pipe in order to provide adequate strength at the union or has resulted in undesirable weakening of one or the other of the pipe sections at the vicinity of the union. Usually this weakening occurs in connection with the large pipe section because the resistance to collapse diminishes with increasing diameter if the wall thickness remains constant.

One object of the present invention is to overcome the above problem by providing an arrangement at the end of the larger pipe section which minimizes reduction of wall cross-section and also strengthens the end of the large pipe against collapse by means of a reduced lip formed as part of the pipe section and in such a manner as not to interfere with fluid flow through the union.

The structural shape of pipe union contemplated by the above aspect of the invention is such as to inherently involve work-hardening of the very portion of the large pipe section which is most susceptible to collapse.

The pipe union contemplated by the above aspects of the present invention may be safely used in the field for gasoline connections and the like because the particular structure contemplated by the invention involves threading arrangements which would positively prevent connection of standard unions with the attendant possibility of leakage due to improper seating and the like.

In broader aspects of the invention, poorer quality unions may be manufactured while still retaining some of the advantages of the invention, particularly simplicity and low cost, by eliminating the reduced lip and attendant work-hardening and even by making unions in which threads are cut in relatively thin pipe walls.

These and other objects and advantages of the invention will become more fully apparent from the following description of one specific embodiment of the invention which is set forth merely by way of example and not by way of limitation.

Figure 1:
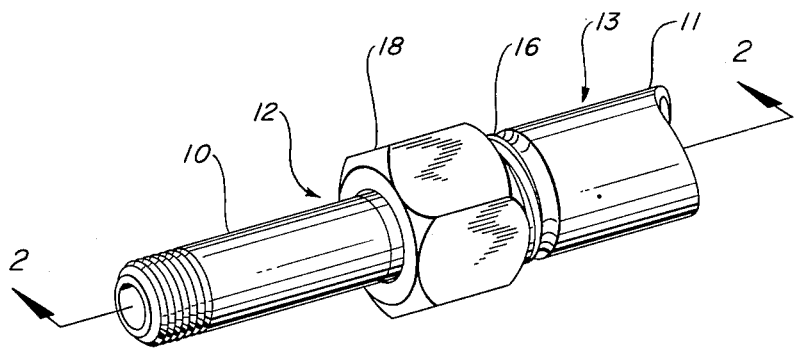
FIGURE 1 illustrates a portion of a fluid conducting line in which a change of pipe diameter is to occur.
Figure 2:
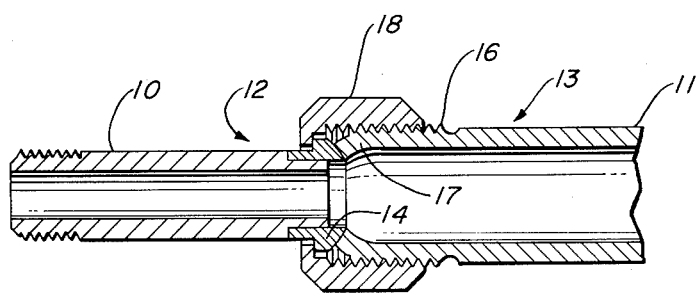
FIGURE 2 is a cross-sectional view taken on the plane of line 2—2 in FIGURE 1.

Included in the fluid conducting line are two pipes 10 and 11. It will be understood that one or both of these pipes may comprise other than long pipe units and may in fact comprise merely bosses or other short lengths of tubular character associated with valves, pressure regulators, and other fluid system elements. Each of the pipes 10 and 11 comprises a terminal length associated with the union between the pipe. Thus, the pipe 10 includes a terminal length generally indicated by the reference numeral 12 associated with the union between the pipes 10 and 11; and the pipe 11 comprises a terminal length generally indicated by the reference numeral 13 associated with the union between the pipes 10 and 11. The terminal length 12 has a smaller wall cross-section and a smaller internal and external diameter than the terminal length 13. There is provided at the end of the terminal length 12, a male seating head which projects radially outwardly of the external diameter of the terminal length 12. In the particular embodiment illustrated, the male seating head comprises a bulged brass sleeve, collar or boss 14 which is shrink-fitted, brazed or otherwise secured to a relieved or reduced portion of the pipe 10 as illustrated in the drawing. The end of the terminal length 13 of the large pipe 11 is formed as a female seating socket which receives the male seating head 14. In the particular union illustrated, the terminal length 13 at the end zone adjacent the female seating socket tapers inwardly from the above-mentioned wall cross-section of the terminal length 13 to a reduced cross-section adjacent the female seating socket. This reduced cross-section has an inner diameter which is greater than the inner diameter of the terminal length 12.

The outer wall of the terminal length 13 has threading 16 formed therein toward the end thereof. In the particular union illustrated, the crests and roots of this threading respectively extend radially outwardly and inwardly of the external diameter of the terminal length 13. This relationship may be achieved by conventional means, such as by rolling the threading 16.

An internally threaded coupling collar 18 is received on the terminal length 12 and is clampingly engaged with the back side of the male seating head, which in the illustrated embodiment comprises the sleeve, collar or boss 14. The internally threaded portion of the coupling collar 18 is located radially outwardly of the periphery of the male seating head and is threadedly engaged with the threads 16 on the outer wall of the terminal length 13.

When the coupling collar 18 is drawn up tightly on the thread 16, the male seating head is firmly received in the female seating socket in fluid-sealing relationship. It is to be noted that in the illustrated union, the turned-in lip or portion 17 (formed by the above described inward tapering of the second terminal length at the end zone adjacent the female seating socket) provides a brace against collapse of the end of the terminal length 13 in that it provides a relatively small arch or diameter. Furthermore, it is to be noted that the portion 17 does not interfere with flow through the fluid conducting line since it is of greater inside diameter than the inside diameter of the terminal length 12.

The turning in of the end of the terminal length 13 to form the lip or portion 17 may be accomplished by conventional swaging or forming operations which will inherently result in work-hardening of the metal in the vicinity of the portion 17 and in the vicinity of the first few threads 16 adjacent to this portion. This is precisely the location where increasing resistance to collapse is most important.

A pipe union for joining two pipes forming part of a fluid conducting line in which a change of pipe diameter occurs has a particularly useful application in connection with furnaces and space heaters and other gas burning appliances where the burner manifold is connected with furnace or burner controls, such as solenoids, pressure regulators, manually operated valves, and the like, and where it is desired that fluid coming from the controls flow into a manifold line that has a relatively large cross-section in order to reduce the velocity of the gas flow along the manifold to tend to equalize the flow to the several burners supplied from the manifold. In such an application, the pipe 10 might lead from a furnace or burner control element and the pipe 11 might constitute a burner manifold which communicates with a number of burner outlets in communication with the bore of the pipe along its length. However, there may occur other applications in which reduction of pipe size in a fluid conducting line is desirable or permissible and where it is advantageous to accomplish such a reduction by means of a union at substantially lower cost than that involved in combining conventional pipe unions with reducing fittings or tapered pipe lengths.

The invention is not limited to the precise details of the embodiment described above. For example, in some cases it may be desirable to form the male seating head from steel and to provide a thin brass seat at the section of the female seating socket. Still other variants in the described embodiment of the invention are possible.

What is claimed is:

1. A pipe union for joining two pipes forming part of a fluid conducting line in which a change of pipe diameter occurs, the pipes each comprising a terminal length associated with the union between the pipes, a first of the terminal lengths having a smaller wall cross-section and internal and external diameter than the second of the terminal lengths, a male seating head at the end of said first terminal length and projecting radially outwardly of said external diameter of the first terminal length, said second terminal length being of substantially constant wall thickness, a female seating socket at the end of said second terminal length for receiving said male seating head in seating relationship, said male and female elements including sealing structure for establishing a seal when said male element is seated in said female element, said second terminal length at the end zone adjacent said female seating socket tapering inwardly from the said wall cross-section of said second terminal length to a reduced cross-section adjacent said female seating socket which reduced cross-section has an inner diameter which is greater than said inner diameter of the first terminal length, the outer wall of said second terminal length having threading formed thereon toward the end thereof with the crests and roots of the threading respectively extending radially outwardly and inwardly of said external diameter of said second terminal length, an internally threaded coupling collar received on said first terminal length and clampingly engaged with the back side of said male seating head with the internally threaded portion thereof being radially outward of the periphery of said male seating head and threadedly engaged with said threads on the outer wall of said second terminal length.

2. A pipe union for joining two pipes forming part of a fluid conducting line in which a change of pipe diameter occurs, the pipes each comprising a terminal length associated with the union between the pipes, a first of the terminal lengths having a smaller wall cross-section and internal and external diameter than the second of the terminal lengths, a male seating head at the end of said first terminal length and projecting radially outwardly of said external diameter of the first terminal length, said second terminal length being of substantially constant wall thickness, a female seating socket at the end of said second terminal length for receiving said male seating head in seating relationship, said male and female elements including sealing structure for establishing a seal when said male element is seated in said female element, said second terminal length at the end zone adjacent said female seating socket tapering inwardly from the said wall cross-section of said second terminal length to a reduced cross-section adjacent said female seating socket which reduced cross-section has an inner diameter which is greater than said inner diameter of the first terminal length, the outer wall of said second terminal length having threading formed thereon toward the end thereof, an internally threaded coupling collar received on said first terminal length and clampingly engaged with the back side of said male seating head with the internally threaded portion thereof being radially outward of the periphery of said male seating head and threadedly engaged with said threads on the outer wall of said second terminal length.

3. A pipe union for joining two pipes forming part of a fluid conducting line in which a change of pipe diameter occurs, the pipes each comprising a terminal length associated with the union between the pipes, a first of the terminal lengths having a smaller wall cross-section and internal and external diameter than the second of the terminal lengths, a male seating head at the end of said first terminal length and projecting radially outwardly of said external diameter of the first terminal length, said second terminal length being of substantially constant wall thickness, a female seating socket at the end of said second terminal length for receiving said male seating head in seating relationship, said male and female elements including sealing structure for establishing a seal when said male element is seated in said female element, said second terminal length at the end zone adjacent said female seating socket being reduced inwardly from the said wall cross-section of said second terminal length to a reduced cross-section adjacent said female seating socket which reduced cross-section has an inner diameter which is greater than said inner diameter of the first terminal length, said reduction being in the absence of any abrupt change in wall thickness of said second terminal length, the outer wall of said second terminal length having threading formed thereon toward the end thereof with the crests and roots of the threading respectively extending radially outwardly and inwardly of said external diameter of said second terminal length, an internally threaded coupling collar received on said first terminal length and clampingly engaged with the back side of said male seating head with the internally threaded portion thereof being radially outward of the periphery of said male seating head and threadedly engaged with said threads on the outer wall of said second terminal length.

4. A pipe union for joining two pipes forming part of a fluid conducting line in which a change of pipe diameter occurs, the pipes each comprising a terminal length associated with the union between the pipes, a first of the terminal lengths having a smaller wall cross-section and internal and external diameter than the second of the terminal lengths, a male seating head at the end of said first terminal length and projecting radially outwardly of said external diameter of the first terminal length, said second terminal length being of substantially constant wall thickness, a female seating socket at the end of said second terminal length for receiving said male seating head in seating relationship, said male and female elements including sealing structure for establishing a seal when said male element is seated in said female element, said second terminal length at the end zone adjacent said female seating socket being reduced inwardly from the said wall cross-section of said second terminal length to a reduced cross-section adjacent said female seating socket which reduced cross-section has an inner diameter which is greater than said inner diameter of the first terminal length, said reduction being in the absence of any abrupt change in wall thickness of said second terminal length, the outer wall of said second terminal length having threading formed thereon toward the end thereof, an internally threaded coupling collar received on said first terminal length and clampingly engaged with the back side of said male seating head with the internally threaded portion thereof being radially outward of the periphery of said male seating head and threadedly engaged with said threads on the outer wall of said second terminal length.

References Cited in the file of this patent

UNITED STATES PATENTS

| | | |
|---|---|---|
| 471,247 | Vanderman | Mar. 22, 1892 |
| 1,024,560 | Dale | Apr. 30, 1912 |
| 1,363,181 | Henger | Dec. 21, 1920 |

FOREIGN PATENTS

| | | |
|---|---|---|
| 274,138 | Great Britain | July 21, 1927 |
| 11,728 | Great Britain | Dec. 3, 1847 |